United States Patent [19]

Esemplare et al.

[11] Patent Number: 5,326,413

[45] Date of Patent: Jul. 5, 1994

[54] HOT MELT ADHESIVE COMPOSITION THAT MELTS AT RELATIVELY LOW TEMPERATURES

[75] Inventors: Pascal E. Esemplare, Mountainside; Ronald W. Gumbs, E. Brunswick, both of N.J.

[73] Assignee: Pearle, Inc., Dallas, Tex.

[21] Appl. No.: 615,613

[22] Filed: Nov. 19, 1990

[51] Int. Cl.$^5$ ............................................. B32B 31/00
[52] U.S. Cl. ........................... 156/154; 51/216 LP; 51/284 R; 156/155; 156/305; 156/327; 156/344; 524/277; 524/487
[58] Field of Search ............... 156/154, 327, 305, 344, 156/155; 51/284 R, 216 LP; 524/277, 487

[56] References Cited

U.S. PATENT DOCUMENTS

| | | | |
|---|---|---|---|
| 3,944,695 | 3/1976 | Kosaka et al. | 524/277 |
| 4,235,761 | 11/1980 | Koenig | 524/277 |
| 4,280,939 | 7/1981 | Johnson | 524/277 |
| 4,404,299 | 9/1983 | Decroix | 524/487 |
| 5,036,129 | 7/1991 | Atwell et al. | 524/487 |
| 5,041,482 | 8/1991 | Ornsteen et al. | 524/487 |

FOREIGN PATENT DOCUMENTS 2017546  10/1979  United Kingdom ........... 51/216 LP

OTHER PUBLICATIONS

Patent Cooperation Treaty International Search Report mailed Mar. 5, 1992.

*Primary Examiner*—John J. Gallagher
*Attorney, Agent, or Firm*—Arnold, White & Durkee

[57] ABSTRACT

Novel lower temperature hot melt adhesive and coating composition that melts at temperatures less than 190° F. (about 87.8° C). This composition has a sufficient modulus to bind ophthalmic lenses to metal blocks during grinding processes. The composition also exhibits low melt viscosity and may be mechanically removed without leaving significant residue. Composition comprises a resin, a tackifier, a wax (generally with a molecular weight less than 600), and an optional stabilizer.

43 Claims, No Drawings

HOT MELT ADHESIVE COMPOSITION THAT MELTS AT RELATIVELY LOW TEMPERATURES

BACKGROUND OF THE INVENTION

1. Field of the Invention

This invention relates to reusable hot melt adhesive or coating compositions comprising mixtures of resins, waxes, and tackifiers. The compositions melt at significantly lower temperatures than conventional hot melt adhesives or coatings and may be used to permanently or temporarily bind or coat industrial substrates during manufacturing processes. This invention especially relates to use of the novel hot melt adhesive compositions for temporarily holding ophthalmic plastic lenses to supporting metal blocks during grinding and polishing of lenses.

2. Description of the Related Art

Indium alloy adhesive has long been used in the ophthalmic lens manufacturing industry for securing lenses to substrates during grinding. Typically the convex side of the lens is positioned on a block using a gasket. Indium metal is applied in the cavity. After the indium hardens, the lens is ground and then mechanically removed by applying mechanical force to the lens while holding the supporting block stationary. The use of indium has several problems associated with it, some of which include worker toxicity and environmental disposal. As a result, the ophthalmic lens manufacturing industry has searched for a suitable adhesive for holding ophthalmic plastic lenses to supporting substrates during grinding and polishing of the lenses.

Application of heat to a hot melt adhesive brings it to a liquid state, and after removal of the heat it sets by cooling. Where the cooling is rapid, near instantaneous bonding is possible. A hot melt adhesive system frequently offers increased production speeds and lower costs than other adhesive systems.

In general, useful hot melt adhesive compositions are essentially thermoplastic. In the past, a large number of natural and synthetic waxes and resins have served as principal constituents in various useful hot melt adhesive compositions. In addition, tackifiers have been used to modify the properties of the compositions.

In general, hot melt adhesives have not been used for the ophthalmic lens application because the adhesives have required higher melting temperatures than may be used on ophthalmic plastic lenses. Normally, it is not possible to use any adhesive that will contact the lens at a temperature higher than 190° F. (about 88° C.). For most practical applications, it is better if the adhesive contacts the plastic lenses at a temperature no higher than 175° F. (about 80° C.). If the adhesive is applied at a higher temperature, it may result in distortion of the lenses.

Because of the nature of the plastic lens grinding process, it is desirable to have a lens adhesive with a low softening point, adequate adhesion to both the supporting block and the plastic lens, sufficient rigidity to prevent rocking of the lens during the grinding operation, and a low melt viscosity for easy application. In addition, the adhesive should be mechanically removable from lenses, without leaving a residue.

SUMMARY OF THE INVENTION

A general object of this invention is to provide a hot melt adhesive or coating that can be applied at temperatures lower than existing hot melt compositions. In addition to being useful in ophthalmic lens manufacturing processes, the lower temperature hot melt adhesive or coating composition of this invention may reduce system operating costs, reduce the potential for degradation of the composition due to high temperatures, and have a wider range of application than existing higher temperature hot melt compositions.

The hot melt compositions of the invention possess relatively low melting temperatures, low melt viscosities, and sufficient rigidity to hold plastic lenses to a substrate during a grinding operation. The compositions may be mechanically removed from a plastic lens and recycled.. Moreover, the hot melt compositions offer the possibility of near instantaneous bonding. The adhesive compositions also generally melt sharply and below the temperature where deterioration of the optical properties of lenses take place. It has been observed that the hot melt adhesive may be mechanically removed from plastic lenses, and tends to leave only a very small amount of residue, if any, when separated from a plastic lens.

In a general aspect, the compositions of the invention comprise mixtures of a wax, a tackifier, and a resin. In general, these adhesive compositions have a Ring and Ball softening temperature of less than 190° F. (about 88° C.) and some compositions have been prepared that have Ring and Ball softening temperatures as low as 150° F. (about 66° C.). The molecular weight of the wax used in the composition is generally less than 600.

The resin components of the present compositions are the principal strength members of the compositions, but they generally have softening points which are excessive for such purposes as holding plastic lens for grinding. The wax components are added to the resin components in a minor amount sufficient to provide softening points compatible with the grinding of plastic lenses, while providing components with sufficient rigidity and strength to make such lenses to be ground with necessary accuracy and assurance. The tackifier component is present in a sufficient amount to impart tack to the compositions.

Preferably, the novel hot melt adhesive composition is formulated by using a melt mixing technique in which a wax, together with an antioxidant (if used), is maintained in a stirred molten state at a temperature between about 210°–380° F. (about 99°–193° C.), preferably between about 280°–340° F. (about 138'–171°° C.). At this time, the resin is added, followed by the addition of the tackifier. Mixing is continued until a homogenous mixture is obtained. Mixing time is not normally critical, and may be normally expected to take about 15 minutes to about one hour. The mixture is then poured and cooled or allowed to cool at ambient temperatures, at which temperature the mixture solidifies.

The solid mixture may then be utilized by applying heat to melt the mixture, applying it to substrates, and cooling or allowing the mixture to cool. Upon cooling, the mixture binds the substrates together. Specifically, the novel mixture may be used as a substitute for indium in the ophthalmic lens manufacturing industry. Other lower temperature uses may also be applicable when the user requires temperature sensitive substrates to be bonded. The low melting temperatures of this invention may be a significant energy saving factor since less heat is necessary to liquify the mixture. In addition, the lower temperature compositions tend to reduce degradation, an important environmental and worker-safety factor.

Within the context of this invention, "tackifier" is generally defined to include compounds that add "tack" (i.e. stickiness) to the compositions. All patents referred to in this disclosure are incorporated by reference.

It is anticipated that the mixtures of the invention may also be used in coating processes, since the low melting temperature properties of this invention may broaden the scope of possible hot melt coating processes. The energy, environmental, and safety considerations of a hot melt coating composition are also readily apparent to those skilled in the art.

The several components of the new compositions may be selected from a wide range of resins, waxes and tackifiers. In general the resins will have a softening point greater than about 212° F. (about 100° C.).

DESCRIPTION OF THE PREFERRED EMBODIMENTS

The Resin Component

Ethylene-vinyl ester copolymers that may be used as the resin include copolymers wherein the vinyl esters have from 2–4 carbon atoms. Examples of suitable ethylene-vinyl ester copolymers are ethylene-vinyl acetate, ethylene-vinyl formate, ethylene-vinyl propionate, ethylene-vinyl butyrate and mixtures thereof. The copolymer preferably contains from about 15–40, more preferably 28–33, weight percent of vinyl ester., and preferably has a melt index of about 300–500 decigrams/minute ("dg/min") per ASTM D1238; more preferably a melt index of about 350–450 dg/min. A high melt index copolymer of the type specified exhibits a low melt viscosity and a low melting point. In general, the higher the melt index, the lower the melt viscosity of the copolymer. In general, the lower the melt viscosity of the copolymer, the lower its melting point. The cohesive strength of the polymer also tends to be improved as the melt viscosity is reduced.

Many of the copolymers suitable for use as resins in this invention are commercially available. However copolymers may also be prepared by any method generally employed in the art. The copolymers may be prepared, for example, using the methods described in U.S. Pat. No. 2,200,429 to Perrin et al. and 2,703,794 to Roedel.

Mixtures of ethylene-vinyl ester copolymers may be used to obtain a melt index within the desired range mentioned above. For example, if mixtures of ethylene-vinyl ester copolymers are employed, individual ethylene-vinyl ester copolymers may be used even if they do not have the required melt index, provided that the resulting mixture has a melt index within the defined range.

In addition to the above compounds, it is anticipated that polyethylenes that have melt indices as discussed above may be used as resins. The polyethylenes are prepared by processes well known in the art. For example, polyethylenes with specific gravities up to about 0.945 are prepared by polymerizing ethylene at pressures greater than 500 atmospheres in the presence of peroxide catalysts. Higher density polyethylenes are prepared in lower pressure processes with the use of Ziegler and Phillips type catalysts. Blends of polyethylenes prepared by the same or different processes may be used.

The polyethylenes may also be modified low density polyethylenes prepared in the well-known process of reacting polyethylene with an unsaturated polycarboxylic acid, anhydride, or ester such as shown in U.S. Pat. No. 3,856,889. The polyethylenes reacted with this unsaturated component may be a low molecular weight or degraded polyethylene. Modified polyethylenes alone, or blends of modified polyethylenes with unmodified polyethylenes may be used.

In addition to the above compounds, it is contemplated that ethylene n-butyl acrylate copolymers may be utilized. These copolymers may be produced by polymerization techniques which produce a random copolymer of ethylene and acrylic (or methacrylic) acid such as taught in U.S. Pat. Nos. 4,351,931 and 3,520,861. The copolymers may also be produced by graft polymerization techniques such as taught in U.S. Pat. No. 3,177,269. The copolymers may be treated to neutralize some or all of the acid groups with a metal ion such as alkyl metal ion. The neutralized copolymers are referred to in the art as ionomers.

Resins may also be prepared from partially neutralized random copolymers of ethylene and a monomer containing acid groups as taught in Rees' U.S. Pat. No. 3,264,272. This patent also discloses that the copolymer may contain other monomers.

In addition to the above, resins may be prepared if ethylene is polymerized with mono-unsaturated esters, such as vinyl esters of $C_{1-4}$ carboxylic acids and $C_{1-5}$ alkyl esters of acrylic acid and methacrylic acid. Suitable vinyl esters of $C_{1-4}$ carboxylic acids include vinyl acetate, vinyl formate, vinyl propionate, and vinyl butylate. Suitable $C_{1-5}$ alkyl esters of acrylic acid and methacrylic acid include methyl methacrylate, ethyl methacrylate, ethyl acrylate and isopropyl acrylate.

Desirable resin terpolymers may also be prepared by polymerizing ethylene, the vinyl ester of a $C_{1-4}$ carboxylic acid, and a mono or di-unsaturated monomer. Typically, the monomer comprises a compound such as acrylic acid, methacrylic acid (preferred), itaconic acid, acrylamide, beta dimethylaminoethylmethacrylate, beta hydroxyethyl acrylate, diallyl maleate, diallyl phthalate, diallyl ether, or ethylene glycol dimethacrylate.

Tackifiers

As contemplated in the present invention, suitable tackifiers may be selected from rosins, rosin esters, terpene resins, terpene-phenolic resins, or rosin modified phenolic resins. Tackifiers which are present in the adhesive composition serve to extend the adhesive properties of the resins. Tackifiers for use in the present invention generally have a softening point at a range of about 80°–150° F. (about 27°–66° C.) (preferably 110°–125° F. (about 43°–52° C.)) and are generally solid at room temperature. Once melted, the tackifiers have a low melt viscosity and add a high modulus to the composition. The tackifiers also serve to improve the bonding strength of the composition. Many of the tackifiers described below are commercially available.

Examples of rosin and rosin ester tackifiers that may be utilized in the hot melt system of the invention include both natural and modified rosins, such as gum rosin, wood rosin, tall oil rosin, distilled rosin, hydrogenated rosin, dimerized rosin, disproportionated rosin, polymerized rosin, as well as glycerine and pentaerythritol esters of rosin (including stabilized, hydrogenated, polymerized, disproportionated, dimerized, and unmodified rosin).

Terpene resin tackifiers, sometimes called polyterpene resins, result from polymerization of terpene hydrocarbons, such as bicyclic monoterpene known as pinene, in the presence of Friedel-Crafts catalysts at moderately low temperature. Suitable terpene resin may include polymerized beta-pinenes.

Terpene phenolic resin tackifiers may include the product resulting from the condensation of bicyclic terpene (in an acidic medium) or terpene alcohol with phenol.

Rosin-modified phenolic resin tackifiers may include the reaction products of rosin with phenol-formaldehyde condensate.

Rosin and rosin ester tackifiers may be prepared according to the methods described in Encyclopedia of Polymer Science and Technology, Interscience Publishers, a Division of John Wiley & Sons (New York: 1964), Volume 12, pp. 139–164. Terpene resin tackifiers may be prepared according to the methods described in Volume 13, pp. 575–596 of the same publication. Terpene phenolic resin tackifiers and rosin-modified phenolic resin tackifiers may be prepared according to the methods described in Organic Coating Technology, H.F. Payne, John Wiley & Sons (New York: 1954), in Volume 1, pp. 183–184 and 168–170, respectively.

Tackifiers may also include the aromatic examples taught in U.S. Pat. No. 4,018,733, col. 3, lines 28–68, and glycerol esters and fumarate-modified resins as described in U.S. Pat. No. 3,787,346.

Suitable aliphatic unsaturated hydrocarbon resin tackifiers may be prepared by polymerizing unsaturated hydrocarbon monomer mixtures, or streams formed by cracking petroleum. These compounds typically include the mixture of a 5 carbon to 9 carbon stream from petroleum refining, commonly referred to as $C_5$–$C_9$ stream. Hence, the resins prepared from such a stream are commonly referred to as $C_5$–$C_9$ resins. The components of a $C_5$–$C_9$ monomer stream include aliphatic and aromatic hydrocarbon compounds, both normal and branch, in which the number of carbons does not exceed 9.

Other suitable resin tackifiers include hydrocarbon resins substantially free of polymerized aromatics prepared by polymerizing the monomer mixture of the five carbon atom monomer olefin streams from petroleum refining, the monomers being primarily aliphatic. These resins are commonly referred to as $C_5$ resins. The primary monomers of $C_5$ resins are di and monoolefins of both natural and branched 5 carbon components and the mono-olefins of 6 carbon components.

Suitable terpene resin tackifiers also include polyterpene resins derived from α-pinene, β-pinene, and monocyclic terpene such as dipentene.

Tackifiers prepared according to the method described in U.S. Pat. No. 4,081,415 to Mantubara, et al. are also possible tackifiers useful in this composition. The tackifier may be a hydrocarbon resin such as DAC-B hydrocarbon resin prepared according to the process described in U.S. Pat. No. 3,701,760.

The Wax

The wax component may be selected from numerous possibilities, such as mineral wax, paraffin, microcrystalline, petrolatum, vegetable wax, carnauba, candelilla, Japan, animal wax, spermaceti, insect wax, beeswax, synthetic wax, Fischer-Tropsch hydrocarbon wax, cetyl fatty alcohol, stearyl fatty alcohol, stearic fatty acid, palmitic fatty acid, myristic fatty acid, polyglycols, fatty acids, fatty alcohols, or fully refined mineral wax.

The waxes used herein preferably have a melt viscosity at 150° F. (about 66° C.) of about 100–500 cp, more preferably about 20–100 cp. In addition, the Ring and Ball softening temperature of the waxes is preferably 140°–155° F. (about 60°–68° C.), more preferably 140°–145° F. (about 60°–63° C.). In a preferred embodiment, the waxes utilized are primarily linear hydrocarbon compounds, preferably 70–90% aliphatic hydrocarbons.

A polyethylene wax may be employed to reduce the melt viscosity of the hot melt adhesive composition without appreciably decreasing the adhesive bonding. Suitable polyethylene waxes in the present invention have an average molecular weight of less than about 600, preferably 350–450. Polyethylene waxes useful in the present invention usually are essentially linear with at least 70% of the molecules linear, preferably at least 90% (up to about 95%). The n-paraffin or n-alkyl content of hydrocarbon waxes may be determined by molecular sieve adsorption or urea adduction. The enumerated parameters are interrelated as is readily apparent to one of ordinary skill of art.

Polyethylene waxes maybe obtained by low pressure polymerization of ethylene using Ziegler catalysts, such as aluminum trialkyl (triethyl aluminum) and a titanium halide (titanium tetrachloride). High density, low viscosity polyethylene waxes useful in this invention are widely available articles of commerce that can be prepared by known techniques. These waxes may also be made by degrading high density polyethylene to the desired viscosity.

The Fischer-Tropsch hydrocarbon waxes useful in this invention are also widely available articles of commerce and may be prepared by known techniques. These waxes are made by reacting hydrogen and carbon monoxide and are characterized by a high percentage (e.g., over 80%) of normal paraffins. Waxes which may be blended to suit a particular application include polypropylene wax and atactic polypropylene wax. Other suitable waxes are synthetic waxes such as homopolymers of ethylene.

Petroleum waxes that may be useful in this application are described in U.S. Pat. No. 2,504,400, 2,683,141, and 2,712,534. For example, waxes based on polyethylene, oxidized polyethylene, paraffin, oxidized paraffin, oxidized hydrocarbons, and various synthetic waxes such polywax 655 (a polyethylene wax from Barreco); Allied 629 (an oxidized polyethylene wax from Allied Chemical); 180M (a microcrystalline wax from Witco); B120 (an oxidized paraffin wax from Durachem); Efton D-Super (an oxidized hydrocarbon wax from Durachem); Cardipol LP (a synthetic wax from Barreco) are useful.

The waxes employed usually amount to about 10 to 30% weight of the composition of the invention. Other additives such as pigments, fillers, dyes, processing oils and the like may be included.

The Stabilizers

In addition to the adhesive components, it is optionally desirable for the adhesive compositions to contain about 0.1% to about 1.5% by weight, preferably about 0.25% to 1.0%, of one or more stabilizers such as antioxidants. Antioxidants that may be used include tris(di-t-butyl-p-hydroxybenzyl)-trimethyl-benzene (Ionox 330), alkylated hisphenol (Naugawhite), zinc dibutyl dithiocarbamate (Butyl Zimate), 4,4'-methylene bis (2,6-di-tert butylphenol) (Ethyl 702), tetrakis[methylene(3,5-,di,tert,butyl,4,hydroxyhydro cinamate)methane](Irganox 1010), lauryl stearyl thiodipropionate (Plastanox 1212 ), dilauryl 3,3 '-thiodipropionate (Plastanox LTDP) 2,6-di-tert-butyl-p-cresol (BHT) and the like. Other stabilizers include high molecular weight hindered phenols or phosphite derivatives (preferred).

Among the applicable stabilizers included herein are multi-functional phenols such as sulfur and phosphorus-containing phenol. Hindered phenols are well known to those skilled in the art and may be characterized as phenolic compounds which also contain sterically bulky radicals in close proximity to the phenolic hydroxyl group. In particular, tertiary butyl groups generally are substituted onto the benzene ring in at least one of the ortho positions relative to the phenolic hydroxy group. The presence of the sterically bulky substituted radicals in the vicinity of the hydroxy group serves to retard its stretching frequency and correspondingly, its reactivity. This steric hinderance thus provides the phenolic compound with its stabilizing properties.

Representative hindered phenols include: 1,3,5-trimethyl 2,4,6 tris ( 3,5-di-tert-butyl-4-hydroxybenzyl )benzene, pentaerythrityl tetrakis-3(3,5-di-tert-butyl-hydroxyphenol)-propionate, n-octadecyl-3(3,5-di-tert-butyl-4-hydroxyphenol)propionate, 4,4'-methylenebis (2,6-tert-butyl phenol ), 4,4 '-thiobis ( 6-tert-butyl-o-cresol ), 2,6-di-tert-butyl phenol, 6-(4-hydroxy phenoxy) -2,4-bis (n-octyl-thio) -1,3,5 triazine, di-n-octylthio)ethyl 3,5-di-tert-butyl-4-hydroxybenzoate, and sorbitol hexa [3-(3,-di-tert-butyl-4-hydroxyphenyl)propionate].

The performance of these antioxidants may be further enhanced by utilizing in conjunction therewith known synergists such as thiodipropionate esters and phosphites (for instance, distearylthiodipropionate).

The stabilizers, if used, are generally present in amounts of about 0.1 to 1.5 weight %, preferably 0.25 to 1.0%.

EXAMPLES

In making the adhesive the wax was first melted to a liquid state. After an antioxidant (optional) was mixed in, the resin was added slowly to the molten wax, with stirring. The tackifier was then also added slowly, with stirring. As soon as the mixture was homogenous and relatively free of air, it was poured into a suitable container, where cooling and solidification took place.

To test the adhesive, a small amount was placed in the heating well of a dispensing machine designed to permit application of heat through the first substrate, a metal (steel) supporting block. For the purposes of adhesive application, many types of apparatuses may be used so long as the adhesive is adequately melted and not overcooked. One machine used in this application is the Optek Model 2000 blocker.

In applying the adhesive to ophthalmic lenses, the adhesive was melted on a block first substrate and the convex side of a second substrate, a plastic ophthalmic lens, was positioned over the block using a gasket. The now-liquid adhesive flowed into the cavity of the block, in a manner similar to the way indium metal has been used in the art. After allowing the adhesive to cool and harden, the attached block was connected to an arm of a grinding machine. The lens was then ground to the required prescription. After polishing, deblocking was accomplished using a cylindrical hollow fixture having an inside diameter greater than that of the block and an outside diameter less than that of the lens. Sufficient force was applied to completely remove the adhesive from the lens.

Typical plastics used for ophthalmic lenses are homopolymers or copolymers produced from CR-39 monomer, diethylene glycol bisallyl carbonate. These polymers are relatively high strength materials with excellent dimensional and optical stability. Other materials and other plastics, metal, etc. may be used as the substrates of this invention.

Although many different resins, tackifiers, and waxes were tested, optimum formulations of this invention resulted from the use of an ethylene and vinyl acetate resin copolymer, a polyterpene resin tackifier, and a paraffin wax. Specifically, Reichhold Nirez 105 polyterpene tackifier, Dupont Elvax 210 resin, International Wax Refining Co. Fully Refined Paraffin 140–145 wax, and Uniroyal Chemical Naugard P stabilizer (optional) was used.

The resin was used in the range of 18–40 weight % vinyl acetate, preferably 28–33 weight %. The higher weight % vinyl acetate mixtures yielded better adhesion to metal, whereas the lower weight percent vinyl acetate mixtures yielded improved adhesion to the plastic lens. The ethylene and vinyl acetate mixtures tended to yield hot melt adhesives that exhibited good adhesion to a broad range of substrates and excellent compatibility with paraffin, which is important to reduce melt viscosity.

To obtain required melt viscosities and softening points, a low molecular weight resin with a relatively low concentration of wax is desired and preferred, rather than a high molecular weight resin with a higher concentration of paraffin wax. However, the low molecular weight of the resin should be sufficient to provide desired adhesive hardness.

The paraffin waxes used in preparing compositions of the invention comprised mostly straight hydrocarbons, a few branched chain hydrocarbons, and some cyclic groups. While the exact distribution of the different chemical types in each wax was not known, it was generally established that the relative distribution of the different types of hydrocarbons may have a marked effect on the tendency of the adhesive to leave a residue on the lens after separation of the block from the lens. The straight chain hydrocarbons were preferred, as these compounds tended to leave less residue on the lenses.

A one-to-one weight percentage ratio of resin (an ethylene and vinyl acetate copolymer comprising about 28 weight % vinyl acetate) to paraffin wax provided the best combination of toughness and viscosity, with the melting point of the wax as the temperature at which hardening takes place. A 130°–135° F. (about 54°–57° C.) paraffin wax was too soft because softening began to take place during grinding and at warm ambient temperatures. A fully refined paraffin wax with a melting point of 135°–160° F. (about 57°–71° C.) was useful, with 140°–155° F. (about 60–68° C.) preferred, and 140°–145° F. (about 60°–63° C.) more preferred. The fully refined waxes tend to offer the best compromise between low temperature of application and the absence of thermal distortion during use.

It was necessary to add a hard modifying resin tackifier to confer both tack and modulus to the hot melt adhesive. The tackifier needed to have a low softening point, low melt viscosity, and compatibility with both the resin and wax. It was found that the polyterpene resin tackifiers were preferred and performed best at a level of about 50% by weight.

Since in the preferred form the tackifier is about 50% by weight of the composition, and the resin and wax component is about 50% by weight of the composition, a preferred embodiment of the invention comprises about 50% tackifier, about 25% resin, and about 25% wax, as described above. Other workable formulations may be prepared which comprise about 40-60 weight % tackifier, with about 48-56 weight % preferred, and about 15-30 weight % resin and wax, with about 20-30 weight % preferred for each. It will be readily apparent to those skilled in the art that the weight percentages of the resin and wax in relation to each other may also vary greatly depending on the particular composition prepared.

Functional formulations were also produced by replacing up to about 25% of the ethylene vinyl acetate resin with a terpolymer comprising: (1) ethylene, vinyl acetate and acrylic acid; or (2) ethylene, vinyl acetate and an unsaturated carboxylic acid capable of reacting with either vinyl acetate or ethylene. This unsaturated carboxylic acid may comprise methacrylic acid. It is anticipated that up to about 50% of the ethylene vinyl acetate resin may be replaced with such terpolymer.

Antioxidants were used to improve the thermal stability of the hot melt mixtures. While degradation was not entirely eliminated by their use, oxidation was minimized. Butylated hydroxy toluene (BHT) was used in this application, preferably at a concentration of 0.5-1.0% by weight. Other antioxidants may be used such as hindered phenols or phosphite derivatives, preferably in concentrations of 0.5-1.0% by weight.

It is anticipated that further modifications and alternative embodiments of the invention will be apparent to those skilled in the art in view of this description. Accordingly, this description is to be construed as illustrative only and for the purpose of teaching those skilled in the art the manner of carrying out the invention. It is understood that the forms of the invention described herein are to be taken as the presently preferred embodiments. Elements and materials may be substituted for those described and illustrated herein, parts and processes may be reversed, and certain features of the invention may be utilized independently, all as would be apparent to one skilled in the art after having the benefit of this description of the invention. Changes may be made in the elements described herein or the steps or in the sequence of steps of the methods described herein without departing from the spirit and scope of the invention as described in the following claims. Similarly, isomers and homologs of reactants may be used and still come within the scope of the invention. For instance, it is readily apparent to those skilled in the art that many resins, tackifiers, waxes, and stabilizers may be substituted for the materials described in the examples.

What is claimed is:

1. A method of mounting an ophthalmic lens for grinding, which comprises:
mounting the lens on a block such that a cavity results between the block and the lens;
filling the cavity between the lens and the block with a liquid hot melt adhesive at a temperature less than 190° F. (87.8° C.), the hot melt adhesive comprising 15-30 weight percent of a resin having a melt index of 300-500 dg/min per ASTM D1238, 15-30 weight percent of a wax having a Ring and Ball softening temperature between about 135°-160° F. (about 57°-71° C.), and 40-60 weight percent of a tackifier, and wherein the adhesive is strong enough to bind the lens to the block during grinding of the lens;
cooling the adhesive sufficient to bond the lens to the block.

2. The method of claim 1, further comprising the step of grinding the lens.

3. The method of claim 2, further comprising the step of releasing the ground lens from the block and the adhesive.

4. The method of claim 3, wherein no significant residue from the adhesive remains on the lens after it is released.

5. A hot melt adhesive composition, comprising:
15-30 weight percent of a resin having a melt index of 300-50 dg/min per ASTM D1238;
15-30 weight percent of a wax having a Ring and Ball softening temperature between about 135°-160° F. (about 57°-71° C.), a molecular weight of less than 600, and a melt viscosity of 100-50 cp at 150° F. (about 66° C.);
40-60 weight percent of a tackifier; and
the composition being tacky, having a Ring and Ball softening temperature less than 190° F. (87.8° C.),
and being sufficiently strong and adhesive to bind an ophthalmic lens to a substrate during grinding of the lens.

6. A composition as in claim 5 wherein aid composition has a Ring and Ball softening temperature of less than 175° F. (about 79.4° C.).

7. A composition as in claim 5 wherein said composition has a Ring and Ball softening temperature of less than 165° F. (about 73.9° C.).

8. A composition as in claim 5 wherein said composition has a Ring and Ball softening temperature of less than 150° F. (about 65.6° C.).

9. A composition as in claim 5 wherein the wax has a molecular weight of less than 450.

10. A composition as in claim 5 wherein said composition has a melt viscosity of between 1,000 and 90,000 centipoise at 150° F. (about 65.6° C.).

11. A composition as in claim 5 wherein said composition has a melt viscosity of between 1,000 and 25,000 centipoise at 150° F. (about 65.6° C.).

12. A composition as in claim 5 wherein said composition has a melt viscosity of between 5,000 and 15,000 centipoise at 150° F. (about 65.6° C.).

13. A composition as in claim 5 wherein said resin comprises a copolymer of ethylene and a second chemical component, and said second component is vinyl acetate, acrylic acid, methacrylic acid, vinyl acetate and acrylic acid mixed together, vinyl acetate and methacrylic acid mixed together, an unsaturated carboxylic acid capable of reacting with ethylene, vinyl acetate and an unsaturated carboxylic acid capable of reacting with ethylene mixed together, itaconic acid, vinyl acetate and itaconic acid mixed together, fumaric acid, fumaric acid and vinyl acetate mixed together, maleic acid, maleic acid and vinyl acetate mixed together, or mixtures thereof.

14. A composition as in claim 13 wherein said second component comprises 18-40 wt. % of said copolymer.

15. A composition as in claim 13 wherein said second component comprises 25-33 wt. % of said copolymer.

16. A composition as in claim 5 wherein the resin comprises a copolymer of ethylene and a vinyl ester of a carboxylic acid having from one to four carbon atoms.

17. A composition as in claim 5 wherein the resin comprises a copolymer of ethylene and an alkyl ester of acrylic or methacrylic acid wherein the alkyl group has one to five carbon atoms.

18. A composition as in claim 5 wherein the resin comprises a terpolymer of ethylene, a vinyl ester of a $C_{1-4}$ carboxylic acid, and a mono or di-unsaturated monomer.

19. A composition as in claim 13 wherein 0-50 wt. % of the resin further comprises a terpolymer, and the terpolymer is:
ethylene, vinyl acetate and acrylic acid;
ethylene, vinyl acetate and methacrylic acid;
ethylene, vinyl acetate and an unsaturated carboxylic acid capable of reacting with ethylene;
ethylene, vinyl acetate and fumaric acid;
ethylene, vinyl acetate and maleic acid;
ethylene, vinyl acetate and itaconic acid;
or mixtures thereof.

20. A composition as in claim 5 wherein the wax has a Ring and Ball softening point of between 140°-155° F. (about 60°-68.3° C.).

21. A composition as in claim 5 wherein the wax has a Ring and Ball softening point of between 140°-145° F. (about 60°-62.8° C.).

22. A composition as in claim 5 wherein the wax comprises a natural or synthetic wax.

23. A composition as in claim 22 wherein the wax is mineral wax paraffin, microcrystalline, petrolatum, vegetable wax, carnauba, candelilla, Japan, animal wax, spermaceti, insect wax, beeswax, synthetic wax, Fischer-Tropsch hydrocarbon wax, cetyl fatty alcohol, stearyl fatty alcohol, stearic fatty acid, palmitic fatty acid, myristic fatty acid, polyglycols, fatty acids, fatty alcohols, or fully refined mineral wax.

24. A composition as in claim 5 wherein the tackifier is a modifying resin, and the modifying resin is a rosin, a rosin ester, a zinc resinate, a polyterpene, a terpene, a phenolic, an aliphatic hydrocarbons, an aromatic hydrocarbons, coumaroneindene, or a phenolic modified coumarone-indene.

25. A composition as in claim 5 wherein the resin comprises 20-30 wt. % of the composition, the tackifier comprises 48-56 wt. % of the composition, and the wax comprises 20-30 wt. % of the composition.

26. A composition as in claim 5, further comprising a stabilizer.

27. A composition as in claim 26 wherein the stabilizer is an antioxidant.

28. A composition as in claim 26 wherein the stabilizer is a hindered phenol, a phosphite derivative, or butylated hydroxy toluene.

29. A composition as in claim 5 wherein:
the resin comprises an ethylene-vinyl acetate copolymer and the vinyl acetate comprises 25-33 wt. % of the copolymer;
the wax comprises paraffin and;
the tackifier comprises polyterpene resin 30. A method for manufacturing the composition in claim 5 comprising the steps of:
melting the wax;
adding the resin;
adding the tackifier;
mixing; and
pouring into a container and cooling.

31. A method of manufacturing the composition in claim 30, further comprising adding a stabilizer.

32. The composition of claim 5 wherein the composition is mechanically removable from the lens after grinding without substantially distorting the lens.

33. The composition of claim 5 wherein the composition is mechanically removable from the lens after grinding without leaving a significant residue on the lens.

34. A method of using the composition of claim 5 to adhere two substrate together comprising the steps of:
heating the composition until liquid;
applying the composition to at least one of the substrates desired to be adhered together;
contacting the substrates such that the composition contacts both substrate; and
cooling the composition until hardened.

35. The method of claim 34 wherein the substrate are a plastic and a metal.

36. The method of claim 31 wherein the plastic comprises an ophthalmic lens.

37. The method of claim 34, further comprising the step of separating the surfaces by reheating the composition or the surfaces.

38. The method of claim 34, further comprising the step of mechanically separating the surfaces.

39. The method of claim 38 wherein the separation of the surfaces is achieved by applying a force to one of the surfaces while preventing the other surface(s) from moving.

40. The method of claim 34 wherein at lest one of said surfaces comprises at least one ophthalmic lens.

41. A method of mounting a synthetic ophthalmic lens for grinding, which comprises:
mounting the synthetic lens on a block;
filling the cavity between the lens and the block with the hot melt adhesive from claim 5;
cooling the adhesive sufficiently to bond the lens to the block.

42. A hot melt adhesive composition, consisting essentially of:
15-30 weight percent of a resin having a melt index of 300-500 dg/min per ASTM D1238;
15-30 weight percent of a wax having a Ring and Ball softening temperature between about 135°-160° F. (about 57°-71° C.); and
40-60 weight percent of a tackifier, and wherein the composition has a Ring and Ball softening temperature less than 190° F. (87.8° C.), wherein the composition is tacky and sufficiently strong and adhesive to bind an ophthalmic lens to a substrate during grinding of the lens.

43. A composition as in claim 42 wherein the tacky composition may be mechanically removed from the lens without substantial distortion of the lens and without leaving a significant residue on the lens.

* * * * *

UNITED STATES PATENT AND TRADEMARK OFFICE
CERTIFICATE OF CORRECTION

PATENT NO. : 5,326,413

DATED : July 5, 1994

INVENTOR(S) : Pascal E. Esemplare and Ronald W. Gumbs

It is certified that error appears in the above-identified patent and that said Letters Patent is hereby corrected as shown below:

In claim 5, column 10, line 17, please delete "300-50 dg/min" and insert therefor --300-500 dg/min--.

In claim 5, column 10, line 21, please delete "100-50 cp" and insert therefor --100-500 cp--.

In claim 6, column 10, line 29, please delete "aid" and insert therefor --said--.

In claim 23, column 11, line 29, please insert a comma after "mineral wax".

In claim 40, column 12, line 35, please delete "lest" and insert therefor --least--.

Signed and Sealed this

Twenty-seventh Day of September, 1994

Attest:

BRUCE LEHMAN

*Attesting Officer*       *Commissioner of Patents and Trademarks*